(12) United States Patent
Boorstin

(10) Patent No.: US 12,149,621 B2
(45) Date of Patent: *Nov. 19, 2024

(54) PARALLEL BLOCK PROCESSING IN BLOCKCHAINS

(71) Applicant: Circle Internet Financial Limited, Dublin (IE)

(72) Inventor: Marcus Boorstin, Cambridge, MA (US)

(73) Assignee: Circle Internet Financial Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/517,329

(22) Filed: Nov. 22, 2023

(65) Prior Publication Data

US 2024/0097902 A1 Mar. 21, 2024

Related U.S. Application Data

(63) Continuation of application No. 17/537,342, filed on Nov. 29, 2021, now Pat. No. 11,849,039.

(51) Int. Cl.
*H04L 9/32* (2006.01)
*H04L 9/40* (2022.01)

(52) U.S. Cl.
CPC ..................................... *H04L 9/32* (2013.01)

(58) Field of Classification Search
CPC ........................................................ H04L 9/32
See application file for complete search history.

(56) References Cited

U.S. PATENT DOCUMENTS

| | | | |
|---|---|---|---|
| 9,760,574 B1 * | 9/2017 | Zhai | G06F 3/061 |
| 10,372,608 B2 * | 8/2019 | Tsirkin | G06F 12/0868 |
| 2017/0177697 A1 * | 6/2017 | Lee | G06F 1/14 |
| 2017/0364702 A1 * | 12/2017 | Goldfarb | G06F 21/6218 |
| 2017/0366395 A1 * | 12/2017 | Goldfarb | H04L 67/01 |
| 2017/0366416 A1 * | 12/2017 | Beecham | H04L 45/50 |
| 2018/0077035 A1 * | 3/2018 | Vlachogiannis | G06Q 10/10 |

(Continued)

FOREIGN PATENT DOCUMENTS

CN 113421095 A 9/2021

OTHER PUBLICATIONS

PCT/US2022/051081, International Search Report and Written Opinion dated Mar. 21, 2023, 10 pages.

*Primary Examiner* — Gary S Gracia
(74) *Attorney, Agent, or Firm* — Patterson + Sheridan, LLP

(57) ABSTRACT

Certain aspects of the present disclosure provide techniques for reporting transactions in a blockchain. The method generally includes instantiating a plurality of worker processes for processing blocks from a blockchain in parallel. Each worker process is generally associated with an offset into a buffer of blocks from the blockchain to be reported to one or more computing resources. A subject block to be reported to the one or more computing resources is selected from the buffer. The subject block is generally a block inserted into the buffer by a worker process. The subject block is validated based on a block number associated with the subject block and a block number of a next block to be reported. Based on validating the subject block, the subject block is reported to the one or more computing resources, and the subject block is marked in the buffer as a reported block.

23 Claims, 6 Drawing Sheets

(56) References Cited

U.S. PATENT DOCUMENTS

| | | | |
|---|---|---|---|
| 2018/0158034 A1* | 6/2018 | Hunt | G06Q 20/00 |
| 2019/0034465 A1* | 1/2019 | Shimamura | G06Q 20/02 |
| 2019/0081793 A1* | 3/2019 | Martino | H04L 9/0894 |
| 2019/0160660 A1* | 5/2019 | Husain | B25J 9/1694 |
| 2019/0179806 A1* | 6/2019 | Reinsberg | H04L 9/0643 |
| 2019/0280875 A1* | 9/2019 | Ragnoni | G06F 21/64 |
| 2019/0310974 A1* | 10/2019 | Pishe | G06F 16/27 |
| 2019/0327081 A1* | 10/2019 | Ow | G06F 21/6245 |
| 2019/0354518 A1* | 11/2019 | Zochowski | G06F 16/2379 |
| 2020/0014529 A1* | 1/2020 | Kanza | G07F 9/001 |
| 2020/0159946 A1* | 5/2020 | Castinado | H04L 63/08 |
| 2021/0092185 A1* | 3/2021 | DeRosa-Grund | G06F 16/27 |
| 2021/0192516 A1* | 6/2021 | DeRosa-Grund | H04L 9/3231 |
| 2021/0194672 A1* | 6/2021 | Narayanam | G06F 9/4418 |
| 2021/0303375 A1* | 9/2021 | Stevens | G06F 9/544 |
| 2021/0350887 A1* | 11/2021 | DeRosa-Grund | H04L 9/3247 |
| 2022/0012731 A1* | 1/2022 | DeRosa-Grund | G06F 16/2365 |
| 2022/0270725 A1* | 8/2022 | DeRosa-Grund | G06F 16/2365 |
| 2022/0277027 A1* | 9/2022 | Arora | G06F 16/2379 |
| 2022/0351290 A1* | 11/2022 | Creighton, IV | G06Q 20/389 |

\* cited by examiner

PARALLEL BLOCK PROCESSING IN BLOCKCHAINS

CROSS-REFERENCE TO RELATED APPLICATIONS

This application is a continuation of U.S. patent application Ser. No. 17/537,342, entitled "Parallel Block Processing in Blockchains," filed Nov. 29, 2021, and assigned to the assignee hereof, the entire contents of which are hereby incorporated by reference.

INTRODUCTION

Aspects of the present disclosure relate to parallel processing of blockchain data to improve processing and resource utilization efficiency.

BACKGROUND

Blockchains can be used in various decentralized systems to provide a ledger of transactions that have occurred within these decentralized systems. Generally, a blockchain may include a chain of blocks, in which the latest block includes some information about one or more transactions that occurred and a reference to an immediate predecessor block, which may be a hashed value of the previous block. Because the reference to the immediate predecessor block may be a value derived from the immediate predecessor block, verification of the transactions in the blockchain may be performed by ensuring that a hash of a block resolves to the same value as that stored as a reference to the immediate predecessor block in a succeeding block in the blockchain. If there is a mismatch between a computed hash of a block and the hashed value of the block in a succeeding block in the blockchain, validation of the blockchain may fail.

In a cryptocurrency system, transactions including deposits and withdrawals may be processed and recorded in a blockchain. Generally, in processing a transaction in a cryptocurrency system, deposits to an account may be detected, and withdrawals may be confirmed to have been completed successfully. Processing these transactions may be a data-intensive and time-intensive process that is susceptible to delays due to taking a longer amount of time to process a transaction than an amount of time at which transactions occur within the cryptocurrency system. Further, these delays may cascade, causing later transactions to be further delayed in processing, particularly in blockchains that involve significant amounts of data, rapid block generation, and/or nodes that process transactions slowly.

Accordingly, techniques are needed to allow for efficient processing of blockchain data, including, for example, cryptocurrency transactions recorded on a blockchain.

BRIEF SUMMARY

Certain embodiments provide a computer-implemented method for reporting transactions in a blockchain. The method generally includes instantiating a plurality of worker processes for processing blocks from a blockchain in parallel. Each worker process of the plurality of worker processes is generally associated with an offset into a buffer of blocks from the blockchain to be reported to one or more computing resources. A subject block to be reported to the one or more computing resources is selected from the buffer. The subject block is generally a block inserted into the buffer by a worker process of the plurality of worker processes. The subject block is validated based at least on a block number associated with the subject block and a block number of a next block to be reported to the one or more computing resources. Based on validating the subject block, the subject block is reported to one or more computing resources, and the subject block is marked in the buffer as a reported block.

Other embodiments provide a computer-implemented method for processing a block in a blockchain by a worker process in a parallel processing environment. The method generally includes retrieving, from a blockchain, a block for processing based on a block number associated with the block and an offset associated with a worker process. The block is processed. The processed block is inserted into a buffer, wherein an index of the processed block in the buffer is based on a size of the buffer and the block number, and wherein the processed block includes an indication that the block is an unreported block pending reporting to one or more computing resources.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
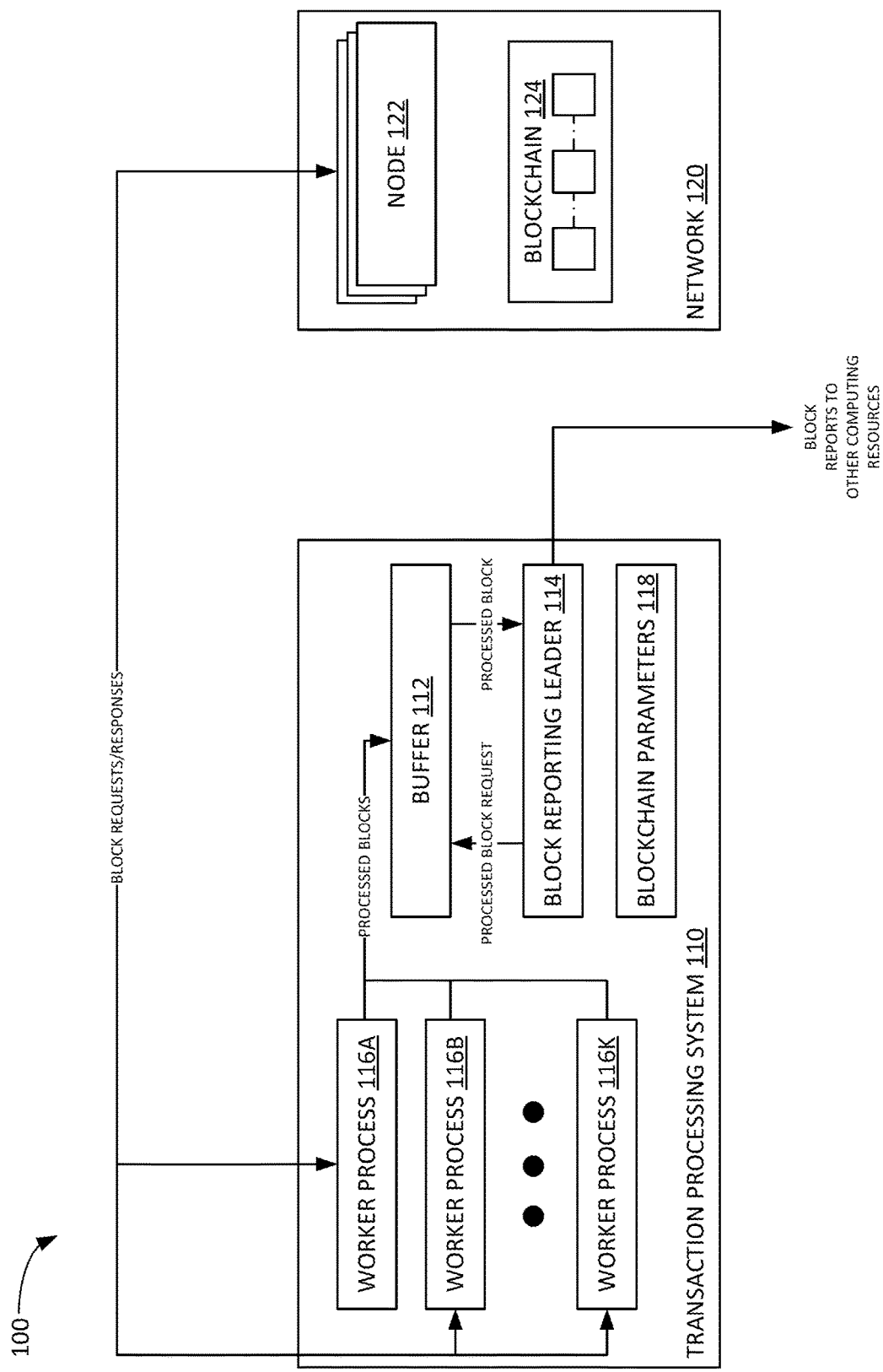
FIG. 1 depicts an example computing system for parallel processing and serial reporting of blocks in a blockchain.

Transactions in cryptocurrency systems may be represented as blocks in a blockchain that track a universe of transactions performed using the cryptocurrency system. In these cryptocurrency systems, processed transactions may not be modified at a later date, thus providing an immutable ledger of the transactions performed using the cryptocurrency system. In many cases, systems used to process these transactions may attempt to process groups of transactions in blocks of the blockchain serially. However, because processing a block including a group of transactions may involve fetching large amounts of data from a blockchain node (e.g., to verify that deposits have been made into an account and to verify that withdrawals from an account have been completed successfully), processing each block may be a time-intensive process. In many cases, the amount of time taken to process a block may exceed the amount of time between the generation of blocks by nodes in the cryptocurrency system. Thus, delays may accumulate and cascade to later blocks over time, leading to significant delays in processing and finalizing transactions in the cryptocurrency system.

To reduce the amount of time needed to process transactions in a cryptocurrency system, various techniques are used to improve the performance of serial processing of blocks in a blockchain in which these transactions are recorded. For example, various techniques can be used to optimize data retrieval processes and minimize the overhead (e.g., in terms of time and processing resources) of system calls to a node in a cryptocurrency system or to databases storing data used in validating the transactions in the cryptocurrency system. In another example, block streaming can be used to notify a block processor that new nodes exist for processing and to minimize a number of system calls needed to retrieve a latest block for processing. However, these techniques may not significantly reduce the overhead involved in processing blocks in a blockchain or allow for a processor to catch up with processing blocks in a blockchain when a mismatch occurs between the amount of time needed to process a block and the amount of time between the generation of new blocks in the blockchain for processing.

Aspects of the present disclosure provide techniques for processing blocks in a blockchain (e.g., such as a blockchain used in cryptocurrency systems) in parallel through a leader process that reports processed blocks to one or more other computing resources (e.g., systems for crediting user deposits in a cryptocurrency system, systems for informing users that withdrawals from their wallet(s) in the cryptocurrency system have been completed, etc.) and a plurality of worker processes that retrieve and process blocks from the blockchain. Generally, the leader thread may report, to the one or more other computing resources, processed blocks written to a buffer by the plurality of worker processes, and each worker process may independently process blocks in parallel. The buffer may store a larger number of processed blocks than the number of worker processes instantiated for processing blocks in the blockchain, which may allow for error recovery (e.g., when blocks fail to be reported successfully to the one or more other computing resources) and for improved performance, as worker processes need not obtain exclusive rights (or a lock) to the buffer in order to commit processed blocks to the buffer for reporting. By processing blocks in a blockchain in parallel and maintaining a buffer including more blocks than the number of worker processes, the speed at which blocks are processed and reported in a blockchain system may be improved. Later blocks may be processed without waiting for earlier blocks to be processed when there is room within a buffer to allow these later blocks to be stored without overwriting earlier unreported blocks, as would be the case in serialized processing of blocks from the blockchain. Further, each worker process may have access to unique portions of the buffer, allowing multiple worker processes to write data to the buffer without needing to obtain an exclusive lock on the buffer in order to write data to the buffer. Thus, blocks in blockchains may be processed more efficiently, reducing time, processing resources, memory, and energy used in processing blocks in these blockchains and finalizing the cryptocurrency transactions recorded in these blocks. Accordingly, aspects described herein improve the performance of blockchain data processing systems, including any processing devices implementing such systems, as well as the related blockchain system (e.g., a cryptocurrency system). Further, aspects described herein provide a technical solution to the technical problem of runaway latency in blockchain data processing systems.

Example Parallel Processing of Blocks in a Blockchain

FIG. 1 illustrates an example computing environment 100 in which blocks in a blockchain are processed in parallel through a block leader process 114 that reports processed blocks to other computing resources and a plurality of worker processes 116 that process blocks for recording in the blockchain. As illustrated, computing environment 100 includes a transaction processing system 110 and a network 120.

Transaction processing system 110 generally retrieves blocks for processing in a blockchain from one or more nodes in network 120, processes these blocks in parallel, and reports the processed blocks to the blockchain. Generally, transaction processing system 110 may be any computing device that can process blocks in a blockchain, such as a server, a compute cluster, desktop computers, laptop computers, mobile computing devices, edge computing devices, or the like. Transaction processing system 110 may be configured to process transactions for a cryptocurrency network, such as network 120. By way of example, network 120 may be one of ALGORAND™, BITCOIN™, ETHEREUM™, SOLANA™, STELLAR™, TRON™, and other cryptocurrency networks.

As illustrated, transaction processing system 110 includes a buffer 112 in which processed blocks are stored for reporting to one or more other computing resources, a block leader process 114, and a plurality of worker processes 116A-116K.

In some aspects, buffer 112 may be structured as a ring, or circular, buffer, in which processed blocks are stored for reporting to one or more other computing resources, such as internal and/or external computing resources for notifying participants in a cryptocurrency system that transactions (e.g., deposits into a wallet and/or withdrawals from a wallet) have been successfully performed and reconciled within the cryptocurrency system. The size of buffer 112 may be based on a number of worker processes 116 used for processing blocks in parallel. For example, if eight worker processes 116 are used to process blocks in parallel, buffer 112 may have a capacity of some multiple of eight blocks to allow for each worker process 116 to have a same capacity within the buffer for storing reported and unreported transactions. In some aspects, the size of buffer 112 may be dynamically set based on the properties of the blockchain for which transaction processing system 110 processes blocks. For example, the size of buffer 112 may be based average times that nodes in the network 120 (e.g., node 122) take to respond to a query, an average amount of time a worker process 116 takes to fully process a new block, a rate at which blocks are generated within a network, and so on. Block reporting leader 114 may, for example, use blockchain parameters 118 to instantiate buffer 112, which may allow transaction processing system 110 to be used to process blocks in various blockchains as processing capabilities are needed for any given network 120. Blockchain parameters 118 may be periodically updated (e.g., by transaction processing system 110 or network 120) to allow for buffer 112 to be instantiated (or potentially re-sized) as the timing and other characteristics of the blockchain change.

Each worker process 116 may be associated with a unique offset, which may be between 0 and the number of worker processes in transaction processing system 110, minus 1. For example, an offset for a worker process 116 may be calculated according to the equation: offset=randomNum mod W, where W corresponds to a number of worker processes 116 instantiated in transaction processing system 110, and where the random number is selected such that each worker process 116 has a unique offset (e.g., no two worker processes 116 share a same offset). Buffer 112 may include space for blocks processed by a particular worker process 116 located at indices derivable from the offset associated with a worker process 116 and the total number of worker processes. For example, assume that a worker process 116 is configured (as discussed in further detail below) with an offset of 0, and eight worker processes are used for processing blocks in parallel. The indices at which blocks processed by the worker process 116 are stored in buffer 112 may thus be indices 0, 8, 16, 24, and so on, up to the size of buffer 112.

Because each worker process 116 is associated with a unique offset, and because the indices at which blocks processed by each worker process 116 may be derived based on this offset and the total number of worker processes 116 in transaction processing system 110, buffer 112 may effectively be structured as a number of interleaved buffers. For a buffer 112 with size B and a number W of worker processes, the size of an interleaved buffer associated with each worker process may be defined as B/W with indices in the buffer 112 for the worker process defined by the equation offset+x*w, where x is a value between 0 and $$\frac{B}{W} - 1.$$

Further, because each worker process 116 is associated with a unique offset, only one worker process 116 may be assumed to write data to the set of indices in the buffer associated with that worker process. Thus, multiple worker processes 116 may write to buffer 112 without needing to obtain a lock on the buffer, as no index in the buffer 112 may be subject to multiple worker processes 116 attempting to write data to a location associated with that index in the buffer 112. Generally, obtaining a lock on a buffer allows only the lock holder to write data to and read data from a buffer and forces other processes to wait for a turn to interact with the buffer. Because worker processes 116 do not need to obtain a lock on the buffer 112 in order to write to buffer 112, many processes may write processed blocks in parallel to buffer 112, which may increase the throughput at which processed blocks are written to the buffer 112 and reduce the likelihood that block reporting leader 114 will have to wait for a block to be written to buffer 112 to report the block to the one or more other computing resources.

Generally, blocks stored in buffer 112 may be associated with a unique block number. The index of any block stored in buffer 112 may be determined based on the equation: blockNumber mod B. Any block with a block number that is a multiple of the size of buffer 112 is thus written to index 0 in the buffer, any block with a block number modulo B equal to 1 is thus written to index 1 in the buffer, and so on. Generally, buffer 112 may be sized such that multiple indices in the buffer 112 are associated with a worker process 116, which may allow for some robustness in reporting (and re-reporting) transactions to one or more other computing resources, as discussed in further detail below.

Block leader process 114 generally is a process that orchestrates initiation of the one or more worker processes 116 and reports processed blocks to one or more other computing resources. For example, in a cryptocurrency system, these other computing resources may include systems that credit deposits to a user's account, mark withdrawals from a user's account as completed, and/or perform other operations with respect to transactions recorded in blockchain 124. In some aspects, block leader process 114 may be configured to instantiate a configured number W of worker processes 116 on startup to process blocks for blockchain 124. Block leader process 114 may further be configured to instantiate additional worker processes as needed in order to catch up with block processing. For example, if block leader process 114 detects a spike in transactions to be committed to blockchain 124 or otherwise receives information indicating that a large number of transactions are awaiting processing, block leader process 114 can instantiate additional worker processes 116 as needed in order to accommodate the spike in transactions to be committed to blockchain 124.

As these worker processes 116 commit processed blocks to buffer 112, block leader process 114 can determine which block(s) are to be reported to the one or more other computing resources and report those block(s) to the one or more other computing resources. Generally, while worker processes 116 may process blocks in the blockchain in parallel, block leader process 114 may be configured to report blocks serially so that recorded transactions are not reported out of the order in which those transactions are recorded in the blockchain. For example, block leader process 114 may be aware of the block number associated with the last block reported to the one or more other computing resources and can assume that the next block to be reported to the one or more other computing resources has a block number that is some amount greater than the block number associated with the last block reported to the one or more other computing resources. Block leader process 114 can also assume that the last block reported to the one or more other computing resources is stored at index i in buffer 112 and the next index, i+1, in buffer 112 will eventually include the block to be reported to the one or more other computing resources. In some aspects, to determine whether to report a block to the one or more other computing resources, block leader process 114 can select the block stored at index i+1 from the buffer 112 and compare the block number of the block at index i+1 with the block number of the next block to be reported to the one or more other computing resources. If the block number of the block at index i+1 matches the block number of the next block to be reported to the one or more other computing resources, block leader process 114 can report the block to one or more other computing resources and mark the block as reported. Generally, by marking the block as reported, block leader process 114 may indicate to the worker processes 116 that the block can be overwritten by another block at a later point in time and can indicate to garbage collection processes executing on transaction processing system 110 that the block can be deleted from buffer 112. Otherwise, block leader process 114 can determine that the block has not yet been processed and placed in the buffer by the worker process 116 responsible for processing the block and can pause until the block is placed in the buffer.

In some aspects, a hash of the next block to be reported to the one or more other computing resources may be used in lieu of or in conjunction with the block number of the next block to be reported to the one or more computing resources in order to determine which block(s) are to be reported. Because hashes are unique values associated with a specific input, a comparison of hashes derived from blocks in the blockchain and blocks in the buffer 112 can be used to identify the next block to be reported. If the hashes of a block in the blockchain and a block in the buffer match, it may be assumed that those blocks are the same block, and block leader process 114 can proceed with reporting the block in the buffer 112. Other techniques, such as comparing information about the previous block in a block in buffer 112 (e.g., a hash of the previous block) to the information about the last reported block, or other information linking blocks in the blockchain, can be used to validate that a block in buffer 112 is the proper block to be reported to the one or more other computing resources.

Block leader process 114 may additionally handle re-reporting of previously reported blocks. Generally, block leader process 114 may receive, at some point in time after initially reporting a block to one or more other computing resources, an indication of whether the reported block was successfully reported to the one or more other computing resources. If the reported block was unsuccessfully recorded, block leader process 114 may retrieve the block from buffer 112 and re-report the block. Generally, each block may remain in the buffer for an amount of time based on the size B of the buffer 112 (e.g., an amount of time equal to B*max(processingTime, reportingTime), where reportingTime represents the amount of time needed to report each block to the blockchain 124 and processingTime represents the amount of time needed to process a block). Thus, until this amount of time elapses, block leader process 114 may be capable of re-reporting a block, which may reduce the likelihood that a blocks in the blockchain will have to be re-processed by the one or more worker processes 116.

Generally, because block leader process 114 is generally aware of the index at which the next block to be reported to the one or more other computing resources is located, block leader process 114 does not need to search for the block in buffer 112. Thus, block retrieval may be a constant time operation (e.g., a process completed with O(1) complexity). Further, the speed at which a block is retrieved may not be affected by the size of buffer 112. In some aspects, blocks to be re-reported (e.g., due to receiving an indication that a previous report failed) may also be retrieved by calculating the index at which the block is located based on the block number associated with the block and the size of the buffer 112. Thus, re-reporting blocks may also be a constant time operation. Still further, because block leader process 114 and the worker processes 116 do not obtain locks on the buffer 112, block leader process 114 need not wait to acquire a lock on the buffer 112 from the worker processes 116 in order to report blocks stored in buffer 112 to the one or more other computing resources.

Worker processes 116A-116K are illustrative of processes that retrieve blocks from a node 122 in network 120 for processing in parallel and storage in a buffer 112. Because worker processes 116 may execute in parallel, multiple blocks may be processed simultaneously for reporting by block reporting leader 114, which may minimize processing bottlenecks that exist in processing blocks serially. While eight worker processes are illustrated in FIG. 1, it should be recognized that any number of worker processes may be instantiated and used to process blocks in a blockchain in parallel. Generally, the number of instantiated worker processes may be selected to balance processing capabilities and compute resource utilization. For example, it may be observed that the speed at which subsequent blocks are processed and reported may decrease asymptotically towards a lower bound as the number of worker processes increases, and each additional worker process may improve the time between processing and reporting subsequent blocks by smaller amounts. Thus, the number of worker processes may be set such that the time between reporting and processing successive blocks is not too close to the lower bound time so that the number of worker processes balances the ability to process blocks with the amount of resources allocated to these worker processes.

Generally, to process a block, worker process 116 may request a block and the associated transaction information from node 122 (e.g., through one or more procedure calls to node 122). As discussed, a block may include a plurality of transactions performed against a plurality of cryptocurrency wallets associated with participants in a cryptocurrency network, such as network 120. For each transaction included in the block, worker process 116 may request additional information from node 122 and/or other remote computing resources (not illustrated), such as ledgers or other information evidencing the occurrence of that transaction. After each block transaction is processed, the block may be deemed processed and written to buffer 112 for eventual reporting to one or more computing resources by block reporting leader 114, as discussed above.

Generally, a worker process 116 may be associated with a unique offset into buffer 112 for use in determining the indices in buffer 112 to which the worker process 116 can write processed blocks and the blocks from node 122 which the worker process 116 is responsible for processing. The unique offset may be determined, for example, based on a random number and the total number of worker processes instantiated in transaction processing system 110. For example, the unique offset may be calculated as randomNum mod W, which results in an offset between 0 and W−1.

In some aspects, worker process 116 may receive information broadcast by network 120 indicating a block number of the last block generated in network 120. Worker process 116 can determine whether it is responsible for processing this block based on the block number and the offset assigned to the worker process 116. For example, if blockNum mod off set=W, worker process 116 can determine that it is responsible for processing this block. Thus, worker process 116 may generate one or more queries against node 122 in network 120 to retrieve the block and other information needed to process the block, process the block, and commit the processed block to buffer 112, as discussed above. Generally, in committing a processed block to buffer 112, worker process 116 may include an indication that the block is unprocessed, which, as discussed above, may be changed by block reporting leader 114 when block reporting leader 114 reports the block to the one or more other computing resources.

In some aspects, the worker processes 116 may query multiple nodes 122 for blocks to be processed by the worker processes 116, which may reduce the processing load on each node, improve the responsiveness of each node, and increase the performance of processing blocks in the blockchain 124 and reporting those blocks to other computing systems. To allow for worker processes 116 to query multiple nodes 122, network 120 can allocate a number N of nodes 122 made available to transaction processing system 110 for querying. Block reporting leader 114 can split the allocated nodes 122 among the instantiated worker processes 116 such that each worker process queries the same node 122 for each block from the blockchain to process. For example, block reporting leader 114 can configure a worker process 116 to query a node with an identifier of blockNum mod N. Generally, the number of workers processes may be equal to some multiple of the number N of nodes 122 allocated to transaction processing system 110 so that any worker process 116 consistently queries for blocks from its associated node 122 and not from nodes 122 associated with other worker processes 116.

Performance Considerations for Parallel Processing and Serial Reporting of Blocks in a Blockchain Generally, the number W of worker processes 116 and the size B of the buffer 112 may be tunable parameters that can be adjusted. Size B of buffer 112 may be tuned so that worker processes 116 need not delay commitment of processed blocks to buffer 112 if the block reporting leader 114 is delayed in reporting blocks to the one or more other computing resources. Generally, size B may be defined as a large multiple of W to allow for multiple processed blocks to be stored for each worker process in transaction processing system 110. For example, B may be set to 128 blocks for values of W below a threshold number (e.g., for up to $2^3=8$ worker processes) and to 256 blocks for values of W above the threshold number (e.g., for more than $2^3=8$ worker processes).

Generally, in selecting the number W of worker processes 116, the total amount of time t between reporting subsequent blocks should be minimized and should be less than the time in which new blocks are made available for processing in network 120. For example, in a network 120 that generates blocks at a periodicity of 400 milliseconds, t should be significantly less than 400 milliseconds so that transaction processing system 110 does not fall behind in processing blocks for network 120. Further, to optimize resource utilization, the number W of worker processes 116 may be optimized such that the block reporting leader 114 always has a block to report; that is, in the time it takes for a worker process 116 to process a block, block reporting leader 114 should have reported a block from each of the other worker processes. Thus, the amount of time w for a worker process to fully process a new block may be defined according to the equation: w=lW, where l represents the amount of time needed for block reporting leader 114 to select a block from buffer 112. The number W of worker processes may thus be represented by the equation:

$$W = \frac{w}{l},$$

and the total amount of time between reporting subsequent blocks may equal l because the block reporting leader should always have a block to report.

Generally, a time t for processing and reporting a block to one or more other computing resources may be approximately equal to w/w and may be significantly larger than l, indicating that the speed at which a worker process 116 processes blocks for the blockchain 124 is a limiting factor in selecting the number of worker threads. For example, as the number W of worker processes 116 instantiated in transaction processing system 110 increases, w may increase monotonically due to the amount of time n needed for node 122 to respond to a query from a worker process 116. Because n may be a limiting factor in minimizing the amount of time needed to process a block for the blockchain 124, it may thus be seen that W may not be arbitrarily increased to decrease t, and t may thus be asymptotic to some lower bound time. However, it may not be useful to increase the number W of worker processes 116 to approach this lower bound time due to the processing overhead needed to run each worker process and increases in the size of buffer 112 to accommodate additional worker processes 116, and because increases in the number W of worker processes may result in a situation in which transaction processing system 110 overloads node 122 with requests. Thus, a number W of worker processes may be selected such that the time t between processing subsequent blocks is somewhat greater than the lower bound time for processing block, which effectively balances performance and resource utilization. Further, the number W of worker processes may allow for transaction processing system 110 to catch up to the latest block(s) awaiting processing in network 120 and may result in a processing time, when transaction processing system 110 is caught up to the network 120, that is close to the speed at which network 120 generates blocks for processing.

Figure 2:
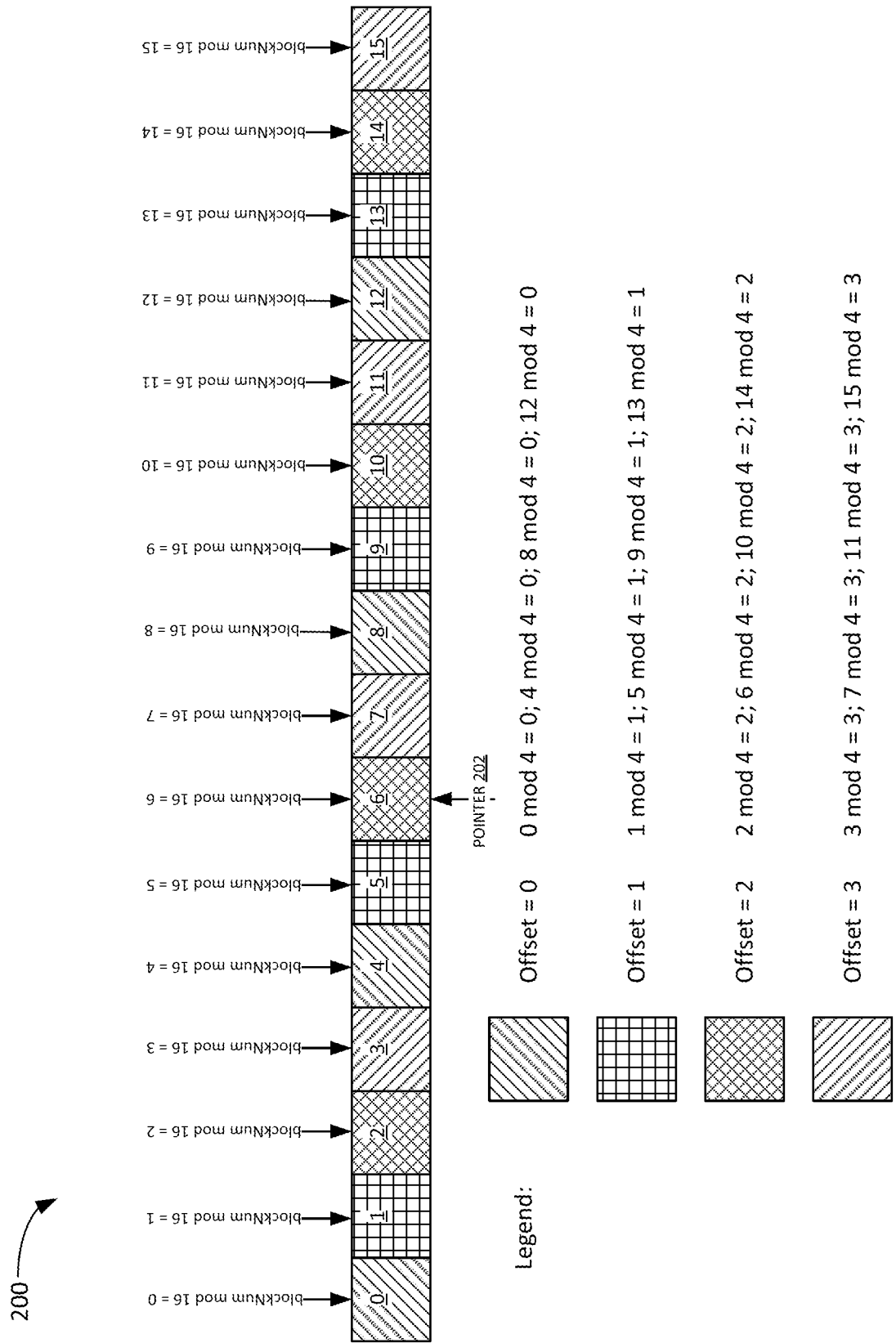
FIG. 2 illustrates an example buffer used in parallel processing and serial reporting of blocks in a blockchain.

Example Buffer for Parallel Processing and Serial Reporting of Blocks in a Blockchain FIG. 2 illustrates an example buffer 200 used in parallel processing and serial reporting of blocks in a blockchain. Buffer 200 may correspond, for example, to buffer 112 illustrated in FIG. 1.

As illustrated, buffer 200 includes a plurality of blocks, with indices 0 through 15, and each block is used to store a block processed by one of four worker processes (e.g., worker processes 116 illustrated in FIG. 1) used for parallel processing of blocks in a blockchain. While buffer 200 is illustrated as including sixteen blocks, it should be recognized that buffer 200 may include any number B of blocks. In some aspects, buffer 200 is sized to include a number of blocks that is evenly divisible by the number W of worker processes instantiated for parallel processing of blocks in a blockchain which, as discussed above, may change dynamically as the processing requirements change within a blockchain network (e.g., network 120).

As discussed above, the location of any block in buffer 200 may be determined based on a block number associated with the block and the size B of buffer 200. For example, the index of any given block in buffer 200 may be determined according to the equation blockNum mod B. In this example, any block that is an even multiple of 16 may be located at index 0 in buffer 200, any block for which blockNum mod B=1 may be located at index 1 in buffer 200, and so on.

Further, as illustrated, buffer 200 may be organized as a series of interleaved ring buffers, with each interleaved ring buffer being associated with one of the worker processes used in processing blocks in the blockchain in parallel. The worker process with offset=0 may store processed blocks in indices that are evenly divisible by the number W of worker processes (e.g., 4). Thus, the worker process with offset=0 may store processed blocks in indices 0, 4, 8, and 12 (e.g., may process blocks where blockNum mod B equals one of 0, 4, 8, or 12). After a block is stored at index 12 in buffer 200, the indices may wrap around to the beginning, and thus, the worker process may store the next processed block at index 0. Similarly, the worker process with offset=1 may store processed blocks in indices for which index mod W=1 (e.g., indices 1, 5, 9, and 13), and so on.

Generally, blocks stored in buffer 200 may not be overwritten by other blocks until a block stored in buffer 200 is designated as a reported block. In some aspects, where none of the blocks stored in buffer 200 at indices associated with a worker process are designated as reported blocks, the worker process may pause processing of blocks until one of the blocks in buffer 200 associated with the worker process have been reported and designated as such.

A block reporting leader (e.g., block reporting leader 114 illustrated in FIG. 1) may maintain a pointer 202 or other information identifying the index in buffer 200 at which the most recently reported block is stored. The next index in buffer 200 after pointer 202 may be assumed to be the location at which the next block to be reported is stored. If, however, the block number of the block stored at the next index in buffer 200 does not match an expected block number for the next block to be reported to the one or more other computing resources, the block reporting leader can pause operations until the block with the expected block number is committed to the next index in buffer 200.

Figure 3:
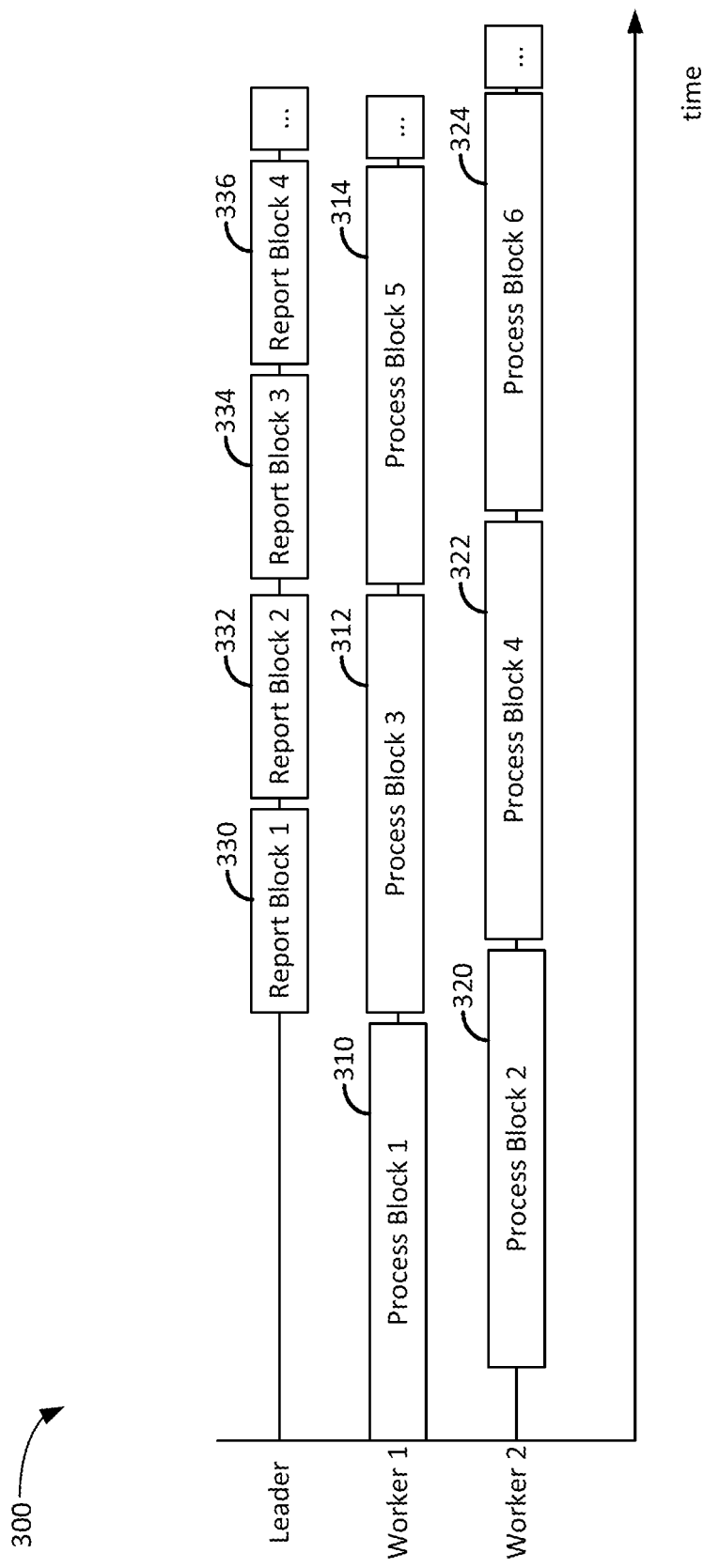
FIG. 3 illustrates an example timeline for parallel processing and serial reporting of blocks in a blockchain.

Example Timeline for Parallel Processing and Serial Reporting of Blocks in a Blockchain FIG. 3 illustrates an example timeline 300 for parallel processing and serial reporting of blocks in a blockchain. In this example, a block reporting leader instantiates two worker processes, designated as Worker 1 and Worker 2.

As illustrated, Worker 1 may process blocks with block numbers that satisfy the equation: blockNum mod 2=1. At time slot 310, Worker 1 may thus process block 1; at time slot 312, Worker 1 may process time slot 3; at time slot 314, Worker 1 may process block 5; and so on. Similarly, Worker 2 may process blocks with block numbers that satisfy the equation: blockNum mod 2=0. Thus, at time slot 322, Worker 2 may process block 2; at time slot 324, Worker 2 may process block 4; at time slot 326, Worker 2 may process block 6; and so on. Generally, time slots in which Worker 1 processes blocks for a blockchain may overlap with time slots in which Worker 2 processes blocks for the blockchain so that Worker 1 and Worker 2 execute substantially in parallel.

At the end of each time slot 310, 312, 314, 320, 322, and 324, the corresponding block may be ready for reporting to the one or more other computing resources. The block reporting leader may be idle until after the end of time slot 310. At time slot 330, which may begin after the end of time slot 310, the block reporting leader may report block 1 to the one or more other computing resources. Similarly, after the end of time slot 320, block 2 may be ready for reporting, and at time slot 332 beginning after the end of time slot 320, the block reporting leader may report block 2 to the one or more other computing resources. Similar timing relationships may exist for other blocks processed by the worker processes in the transaction processing system. Thus, as illustrated, worker processes may process blocks in parallel, and the block reporting leader may report blocks serially. The worker processes may continually fill a buffer with processed blocks for reporting, and block reporting leader may serially report blocks to the one or more other computing resources without needing to wait for blocks to be processed. Generally, the worker processes and the block reporting leader may consistently process data, which may promote more full utilization of compute resources allocated for processing blocks for a blockchain and reporting those blocks to one or more other computing resources.

Example Parallel Processing and Serial Reporting of Blocks in a Blockchain

Figure 4:
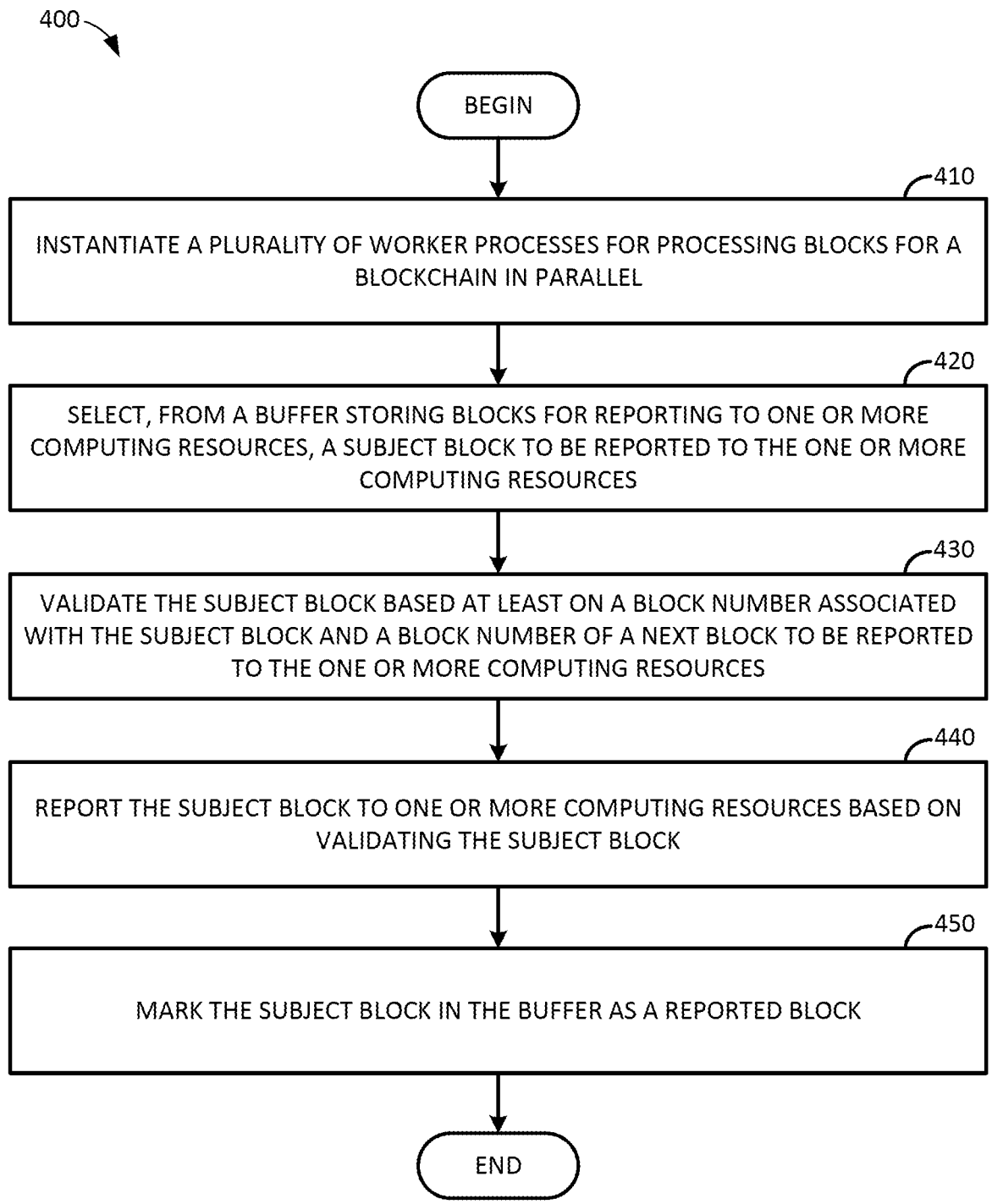
FIG. 4 illustrates example operations for reporting blocks in a blockchain processed in parallel by a plurality of worker processes.

FIG. 4 illustrates example operations 400 for reporting blocks in a blockchain processed in parallel by a plurality of worker processes. The operations described herein may be performed by a block reporting leader process in a transaction processing system (e.g., block reporting leader 114 of transaction processing system 110 illustrated in FIG. 1).

As illustrated, operations 400 may begin at block 410, where a plurality of worker processes for processing blocks for a blockchain in parallel are instantiated. The number W of worker processes may be configured a priori or determined based on an expected rate at which blocks are generated by a cryptocurrency network using a blockchain to irrevocably record transactions or based on the characteristics of the blockchain for which the transaction processing system 110 processes blocks. Each worker process may be associated with an offset into a buffer of blocks from the blockchain to be reported to one or more computing resources. For example, the offset for a worker process may be calculated as randomNum mod W where randomNum is selected so that each worker process is associated with a unique offset and so that no two worker processes attempt to write data to the same indices in the buffer.

In some aspects, the number W of worker process instantiated for processing blocks for a blockchain in parallel may be selected based on an amount of time needed for a worker process to process a block from the blockchain. For example, given an average amount of time expected for a worker process to process a block, an average amount of time needed to report a block to the one or more computing resources, and a size of the buffer, the number of worker processes may be selected so that the buffer is expected to include at least one block of transactions to be reported to the one or more computing resources (e.g., so that the block reporting leader is rarely, if ever, idle and waiting for a processed block to be committed to the buffer). By establishing a number of worker processes that continually provides processed blocks for reporting by the block reporting leader, aspects of the present disclosure may report blocks to the one or more computing resources at a similar rate as a rate at which new blocks are generated within the blockchain, thus minimizing delays in processing transactions in a blockchain and more efficiently utilizing compute resources (e.g., power, processing time, memory, etc.) allocated for processing transactions in the blockchain.

In some aspects, the number W of worker processes may be dynamically changed based on performance characteristics of the blockchain and/or performance characteristics of the transaction processing system. For example, as the rate at which blocks are generated decreases, the number W of worker processes may similarly decrease to minimize wasted compute resources in a transaction processing system. If the number of unreported transactions in the buffer falls below a threshold amount, the number W of worker processes may increase to provide additional data to the buffer and ensure that the block reporting leader process has blocks to report to the one or more other computing resources.

At block 420, a subject block to be reported to the one or more computing resources is selected from the buffer (e.g., buffer 112 illustrated in FIG. 1 or buffer 200 illustrated in FIG. 2). Generally, the subject block is a block inserted into the buffer by one of the plurality of worker processes (e.g., one of worker processes 116A-116K illustrated in FIG. 1) instantiated for processing blocks from a blockchain in parallel.

In some aspects, the subject block can be identified based on an index of the last block in the buffer marked as a reported block. Generally, because block numbers in a blockchain may be sequential and follow a given pattern (e.g., monotonically increase by a set amount), the block reporting leader may be able to derive the block number, and the corresponding index in the buffer, of the next unreported block to be reported to the one or more computing resources from the block number of the last block reported to the one or more computing resources.

In some aspects, to select the subject block, the block reporting leader (e.g., block reporting leader 114 illustrated in FIG. 1) can determine that a location in the buffer at which a worker process associated with a next block for reporting (e.g., the index in buffer 200 immediately after pointer 202 illustrated in FIG. 2) comprises one of a null block or a block marked as reported. Based on this determination, the block reporting leader can pause reporting of blocks to the one or more computing resources temporarily. Reporting may be paused, for example, until the location in the buffer at which the worker process associated with the next block for reporting comprises a block marked as unreported.

At block 430, the subject block is validated based at least on a block number associated with the subject block and a block number of a next block to be reported to the one or more computing resources. Generally, the block number of the next block to be reported to the one or more computing resources may correspond to a block number that is some amount greater than the block number of the last block number reported to the one or more computing resources. If the block number of the subject block does not match the block number of the next block to be reported to the one or more computing resources, the subject block may not be reported, as reporting the subject block may cause transactions to be reported out-of-order. In some aspects, if the block number associated with the subject block does not match the block number of the next block to be reported to the one or more computing resources, the block reporting leader can pause reporting until the block number of the next block to be reported matches the block number associated with the subject block.

At block 440, the subject block is reported to the one or more computing resources based on validating the subject block. At block 450, the subject block is marked in the buffer as a repeated block. As discussed, by marking the subject block as a repeated block, the block reporting leader can designate the index in the buffer at which the subject block is located as a location at which a new processed block can be written and queued for reporting to the one or more computing resources.

In some aspects, the buffer in which blocks are stored for reporting to the one or more computing resources may be a ring buffer interleaving a plurality of worker process-specific buffers. For example, within a global buffer, such as buffer 200 illustrated in FIG. 2, the plurality of worker process-specific buffers may be represented by a particular set of indices in the buffer 200. A worker process-specific buffer for a worker process with offset 0 may include indices 0, 4, 8, and 12 in buffer 200; a worker process-specific buffer for a worker process with offset 1 may include indices 1, 5, 9, and 13 in buffer 200; a worker process-specific buffer for a worker process with offset 2 may include indices 2, 6, 10, and 14 in buffer 200; and a worker process-specific buffer for a worker process with offset 3 may include indices 3, 7, 11, and 15 in buffer 200. Each worker process-specific buffer may be sized such that each worker process-specific buffer includes one or more reported blocks and one or more unreported blocks generated by a worker process associated with a respective worker process-specific buffer. For example, the buffer may have a size of B, and each worker process-specific buffer may have a size of B/W for a number W of worker processes. Entries for each worker process-specific buffer may be located in the buffer at indices defined by the equation: offset+x*w, where x is a value between 0 and $$\frac{B}{W} - 1.$$

In some aspects, a report of a block to the one or more computing resources may fail (e.g., due to a failure to record the block in the one or more computing resources, a network transmission failure, etc.). In some cases, an indication may be received from the one or more computing resources indicating that the subject block was not successfully recorded by the one or more computing resources. In another example, the block reporting leader can determine that the report failed, for example due to a failure to connect to the one or more computing resources. The block reporting leader can retrieve the subject block from the buffer, which may be a block previously marked as reported. In some aspects, to retrieve the subject block, the block reporting leader can calculate the expected position of the block in the buffer based on the block number of the subject block and the size of the buffer. That is, the subject block may be located at an index calculated according to the equation: index=blockNum mod B. Because the block may be directly retrieved from the buffer without searching for the block, retrieval of the block may remain an operation that may be completed in constant time (e.g., with O(1) complexity).

Generally, the block reporting leader may be configured to report blocks in the buffer serially to the one or more computing resources. Serial reporting of processed blocks in the blockchain to the one or more computing resources may be required, for example, when the one or more computing resources expect blocks to be recorded according to a particular sequence of block numbers. Serially reporting these blocks may, for example, enforce serial reporting of transactions within a cryptocurrency network, which may allow for transactions to be reported in the order in which such transactions occurred.

Figure 5:
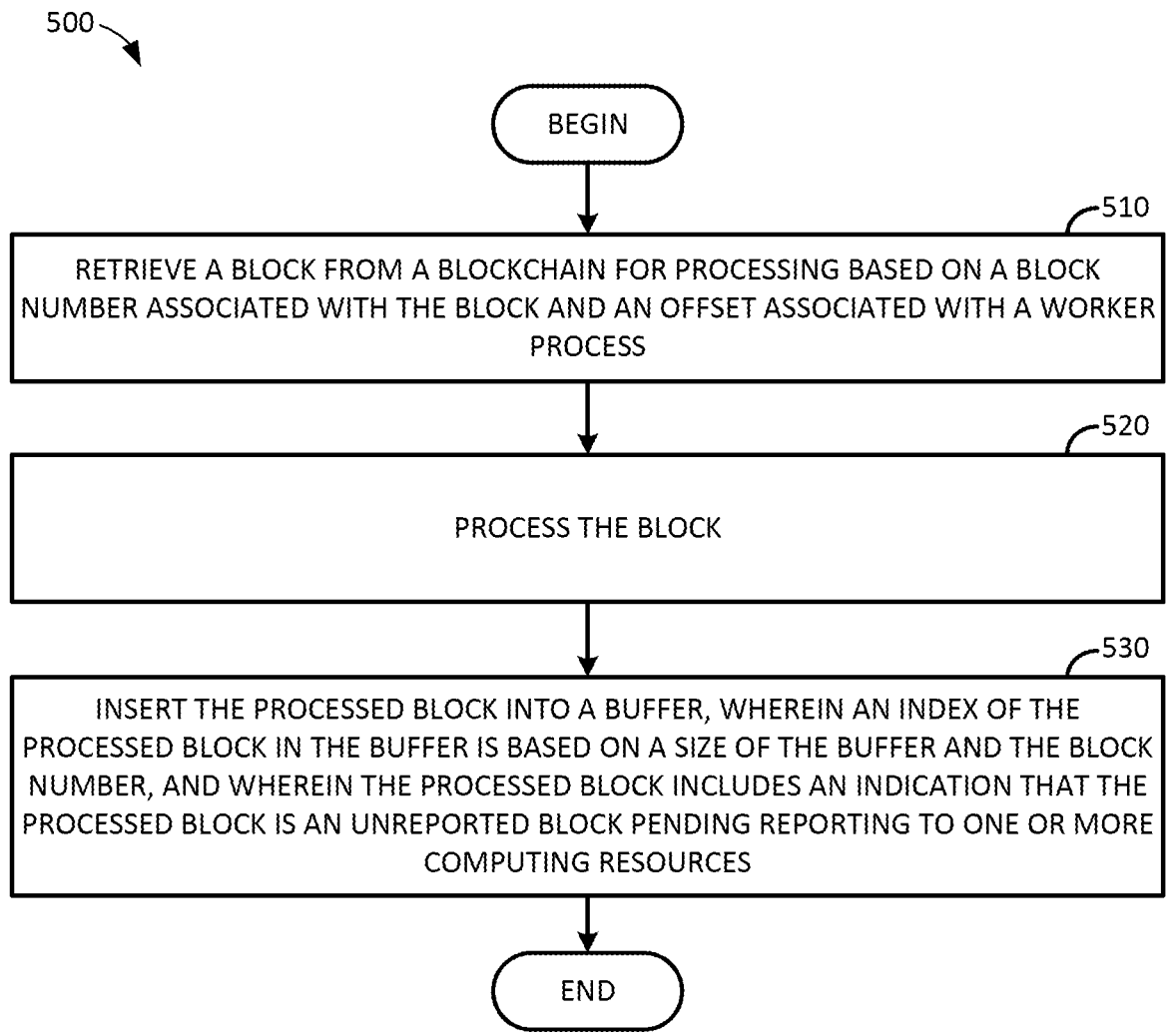
FIG. 5 illustrates example operations for processing blocks in a blockchain by a worker process participating in parallel processing of blocks in a blockchain.

FIG. 5 illustrates example operations 500 for processing blocks in a blockchain by a worker process participating in parallel processing of blocks in the blockchain. Operations 400 may be performed, for example, by process executing in a transaction processing system 110, such as a worker process 116 illustrated in FIG. 1.

As illustrated, operations 500 may begin at block 510, where a block is retrieved for processing from a blockchain. The block may be retrieved from a buffer (e.g., buffer 200 illustrated in FIG. 2) based on a block number associated with the block and an offset associated with the worker process. For example, the block may have a block number that satisfies the equation: offset=blockNum mod W and may be located at an index in the buffer defined by the equation: index=blockNum mod B. In some aspects, the block retrieved from the buffer may be the block located at an index in the buffer immediately after a pointer pointing to an index of the last reported block in the buffer. The offset associated with the worker process may be based on the number of worker processes instantiated by a leader process for processing blocks from the blockchain in parallel. For example, the offset may be calculated according to the equation: offset=randomNum mod W.

At block 520, the block is processed. Generally, in processing the block, the worker process can execute one or more function calls and/or database queries against external compute resources in which data used to validate the transactions included in a block is stored. For example, in a cryptocurrency system, the block may be processed by validating that each transaction included in the block actually occurred and is properly evidenced by one or more records in these external compute resources (e.g., showing that a deposit was made to a cryptocurrency wallet and that a complementary withdrawal from the cryptocurrency wallet was completed).

At block 530, the processed block is inserted into a buffer. The index of the processed block in the buffer may be based on the size of the buffer and the block number. Generally, the processed block includes an indication that the block is an unreported block pending reporting to the one or more computing resources, which, as discussed above, a block reporting leader can use to differentiate between blocks in a buffer that are to be reported to the one or more computing resources and blocks in the buffer that have already been reported to the one or more computing resources (and thus can be overwritten or deleted). In some aspects, inserting the processed block into the buffer may include overwriting a null entry in the buffer or overwriting a reported block in the buffer at an index equal to blockNum mod B. As discussed, the worker process may insert the processed block into the buffer without obtaining a lock on the buffer, as it may be expected that neither the block reporting leader nor the other worker processes in the transaction processing system will concurrently access the location in the buffer at which the worker process is inserting the processed block. Thus, the speed at which blocks are written to and retrieved from the buffer may be increased relative to systems in which a process obtains a lock on the buffer. Further, as discussed, read and write operations for the buffer may be constant time operations, as neither the worker processes nor the block reporting leader may need to search for specific data within the buffer, thus further accelerating the process of writing blocks to and reading blocks from the buffer.

Figure 6:
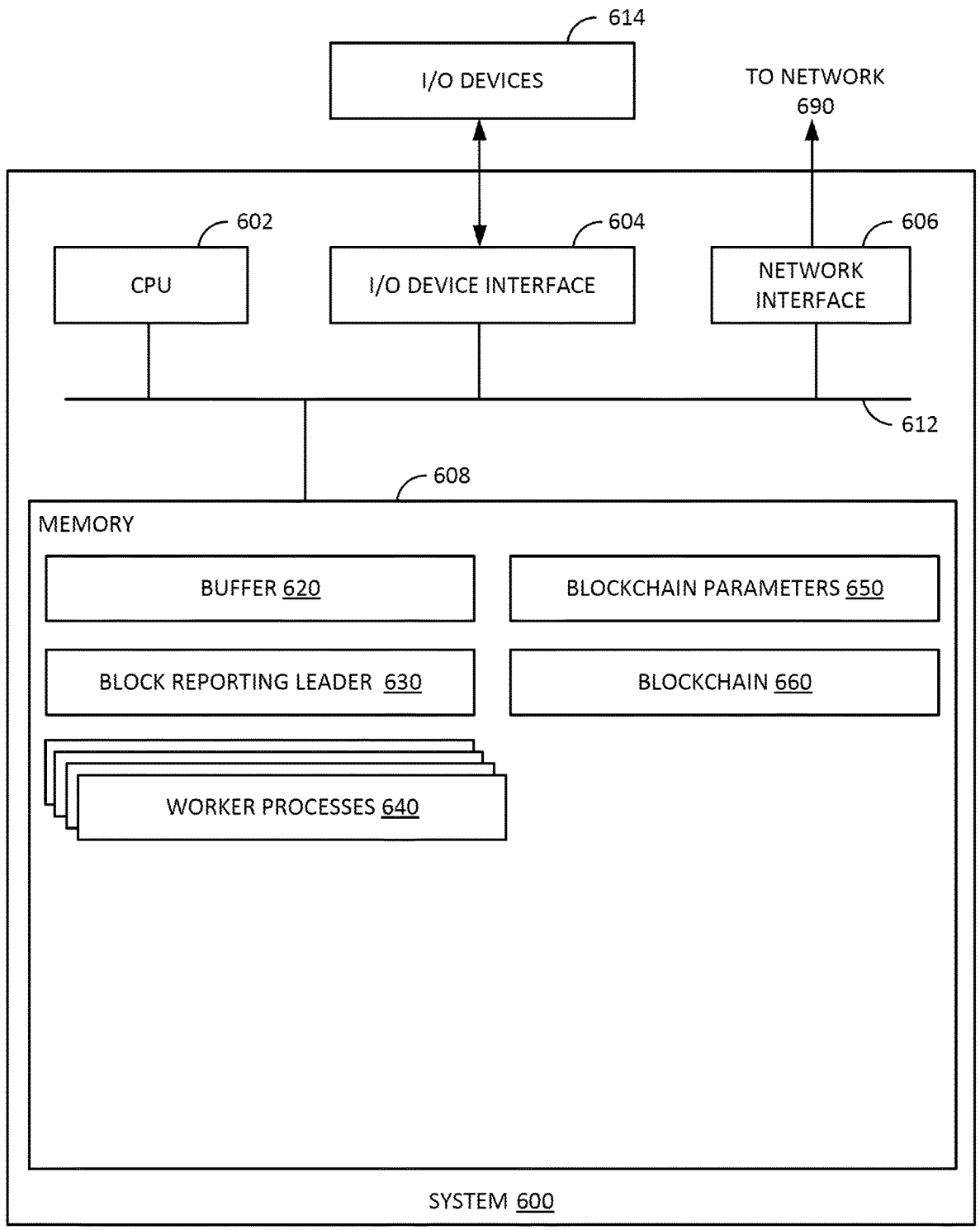
FIG. 6 illustrates an example system on which embodiments of the present disclosure can be performed.

Example System for Parallel Processing and Serial Reporting of Blocks in a Blockchain FIG. 6 illustrates an example system 600 configured to perform the methods described herein, including, for example, operations 400 of FIG. 4 and operations 500 of FIG. 5. In some embodiments, system 600 may act as a transaction processing system on which blocks are processed in parallel and reported serially, such as transaction processing system 110 illustrated in FIG. 1.

As shown, system 600 includes a central processing unit (CPU) 602, one or more I/O device interfaces 604 that may allow for the connection of various I/O devices 614 (e.g., keyboards, displays, mouse devices, pen input, etc.) to the system 600, network interface 606 through which system 600 is connected to network 690 (which may be a local network, an intranet, the internet, or any other group of computing devices communicatively connected to each other), a memory 608, storage 610, and an interconnect 612. The I/O devices 614 and/or network interface 606 may be used to request, from a node in a cryptocurrency network (e.g., node 122 in network 100 illustrated in FIG. 1) on network 690, one or more blocks for processing and to report processed blocks to one or more other computing resources on network 690.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, and memory 608.

CPU 602 is included to be representative of a single CPU, multiple CPUs, a single CPU having multiple processing cores, and the like.

Memory 608 is representative of a volatile memory, such as a random access memory, or a nonvolatile memory, such as nonvolatile random access memory, phase change random access memory, or the like. As shown, memory 608 includes a buffer 620, block reporting leader 630, a plurality of worker processes 640, blockchain parameters 650, and a blockchain 660.

Buffer 620 generally corresponds to buffer 112 illustrated in FIG. 1. Generally, buffer 620 may be a ring buffer (e.g., as illustrated in FIG. 2) in which processed blocks are stored for reporting to one or more computing resources on network 690 by block reporting leader 630. Buffer 620 may have a size of B that allows for each worker process to store multiple blocks. For example, buffer 620 may effectively be a buffer including a plurality of interleaved ring buffers of size B/W where W corresponds to the number of worker process 640 executing on system 600.

Block reporting leader 630 generally corresponds to block reporting leader 114 illustrated in FIG. 1. Generally, block reporting leader 630 instantiates the plurality of worker processes 640 and configures each worker process with a unique offset based on the number of worker process 640 executing on system 600. Block reporting leader 630 may instantiate the plurality of worker processes 640 and the size of buffer 620 based on blockchain parameters 650, which may allow for the number of worker processes 640 and the size of the buffer 620 to be dynamically changed for different blockchains (e.g., blockchain 660 illustrated in FIG. 6, which may correspond to blockchain 124 illustrated in FIG. 1) and/or in response to changes in processing timing within a blockchain. As worker processes 640 commit processed blocks to buffer 620, block reporting leader 630 retrieves these processed blocks from buffer 620 and records these processed blocks to one or more computing resources on network 690. Generally, block reporting leader can determine the identity of the next block to be reported to the one or more computing resources on network 690 based on the block number of the last block reported to the one or more computing resources on network 690 and an assumed rate at which block numbers increase in blockchain 660. Generally, block reporting leader 630 may be configured to report blocks to the one or more computing resources on network 690 serially.

Worker processes 640 generally correspond to worker processes 116 illustrated in FIG. 1. Generally, worker processes 640 execute in parallel to process blocks for a blockchain in parallel so that bottlenecks resulting from serial processing of blocks are avoided. When a worker process 640 completes processing a block for the blockchain, the worker process 640 can commit the processed block to buffer 620 at an index determined based on the block number of the block and the size of the buffer. In some aspects, to process blocks for a blockchain, worker process 640 may listen to information broadcast by a node (e.g., node 122 in a network 120, as illustrated in FIG. 1) for information about blocks to be processed for blockchain 660. When worker process 640 determines that the block number of a block broadcast by the node 122 corresponds to a block that the worker process 640 is assigned to process, worker process 640 can request the block from the node (e.g., via a request transmitted to the node via network interface 606) and receive the block from the node for processing. Worker process 640 may additionally query the node for additional information that may be needed to process the block.

Example Clauses

Implementation details of various aspects of the present disclosure are described in the following numbered clauses.

Clause 1: A method, comprising: instantiating a plurality of worker processes for processing blocks for a blockchain in parallel, each worker process of the plurality of worker processes being associated with an offset into a buffer of blocks to be reported to one or more computing resources; selecting, from the buffer, a subject block to be reported to the one or more computing resources, the subject block having been inserted into the buffer by a worker process of the plurality of worker processes; validating the subject block based at least on a block number associated with the subject block and a block number of a next block to be reported to the one or more computing resources; based on validating the subject block, reporting the subject block to the one or more computing resources; and marking the subject block in the buffer as a reported block.

Clause 2: The method of Clause 1, wherein a size of the buffer is divisible by the number of instantiated worker processes.

Clause 3: The method of any one of Clauses 1 or 2, wherein instantiating the plurality of worker processes comprises selecting a number of worker processes to be instantiated based on an amount of time needed for a worker process to process a block from the blockchain.

Clause 4: The method of any one of Clauses 1 through 3, wherein selecting the subject block to be reported to the one or more computing resources comprises identifying a block in the buffer marked as an unreported block and having a position in the buffer later than a last block in the buffer marked as a reported block.

Clause 5: The method of any one of Clauses 1 through 4, wherein the buffer comprises a ring buffer interleaving a plurality of worker process-specific buffers.

Clause 6: The method of Clause 5, wherein each worker process-specific buffer is sized such that each worker process-specific buffer includes one or more reported blocks and one or more unreported blocks generated by a worker process associated with a respective worker process-specific buffer.

Clause 7: The method of any one of Clauses 1 through 6, further comprising: receiving, from the blockchain, an indication that the subject block was not successfully recorded in the blockchain; retrieving the subject block from the buffer, the subject block having been marked as reported to the one or more computing resources; and re-reporting the subject block to the one or more computing resources.

Clause 8: The method of any one of Clauses 1 through 7, wherein blocks in the buffer are reported serially to the one or more computing resources.

Clause 9: The method of any one of Clauses 1 through 8, wherein selecting the subject block to be reported to the one or more computing resources comprises: determining that a location in the buffer at which a worker process associated with a next block for reporting comprises one of a null block or a block marked as reported; and pausing reporting of blocks to the one or more computing resources until the location in the buffer at which the worker process associated with the next block for reporting comprises a block marked as unreported.

Clause 10: A method, comprising: retrieving, from a blockchain, a block for processing based on a block number associated with the block and an offset associated with a worker process; processing the block; and inserting the processed block into a buffer, wherein an index of the processed block in the buffer is based on a size of the buffer and the block number, and wherein the processed block includes an indication that the block is an unreported block pending reporting to one or more computing resources.

Clause 11: The method of Clause 10, wherein the offset is based on a number of worker processes instantiated by a leader for processing blocks from the blockchain in parallel.

Clause 12: The method of Clause 11, wherein the offset comprises a random number modulo the number of worker processes.

Clause 13: The method of any one of Clauses 10 through 12, wherein the block number modulo a number of instantiated worker processes equals the offset.

Clause 14: The method of any one of Clauses 10 through 13, wherein inserting the processed block into the buffer comprises overwriting a null entry or a reported block in the buffer at an index equal to the block number modulo a size of the buffer.

Clause 15: A system, comprising: a buffer; a plurality of worker processes configured to process blocks in a blockchain in parallel, each worker process of the plurality of worker processes being configured to: retrieve, from a blockchain, a block for processing based on a block number associated with the block and an offset associated with the worker process; process the block; and insert the processed block into the buffer, wherein an index of the processed block in the buffer is based on a size of the buffer and a block number associated with the processed block, and wherein the processed block includes an indication that the block is an unreported block; and a block reporting leader configured to: instantiate the plurality of worker processes, each worker process being instantiated with the offset; select, from the buffer, a subject block to be reported to one or more computing resources; validate the subject block based on a block number associated with the subject block and a block number of a next block to be reported to the one or more computing resources; report the subject block to the one or more computing resources based on validating the subject block; and mark the subject block in the buffer as a reported block.

Clause 16: The system of Clause 15, wherein the offset is based on a number of worker processes instantiated by the block reporting leader.

Clause 17: The system of any one of Clauses 15 or 16, wherein in order to insert the processed block into the buffer, each worker process is configured to overwrite a null entry or a reported block in the buffer at an index equal to the block number modulo a size of the buffer.

Clause 18: The system of any one of Clauses 15 through 17, wherein in order to select the subject block to be reported to the one or more computing resources, the block reporting leader is configured to identify a block in the buffer marked as an unreported block and having a position in the buffer later than a last block in the buffer marked as a reported block.

Clause 19: The system of any one of Clauses 15 through 18, wherein the buffer comprises a ring buffer including a plurality of worker process-specific buffers.

Clause 20: The system of any one of Clauses 15 through 19, wherein the block reporting leader is further configured to: receive, from the one or more computing resources, an indication that the subject block was not successfully reported to the one or more computing resources; retrieve the subject block from the buffer, the subject block having been marked as reported to the one or more computing resources; and re-report the subject block to the one or more computing resources.

Clause 21: A system, comprising: a memory having executable instructions stored thereon; and a processor configured to execute the executable instructions to perform the operations of any one of Clauses 1 through 14.

Clause 22: A system, comprising: means for performing the operations of any one of Clauses 1 through 14.

Clause 23: A computer-readable medium having instructions stored thereon which, when executed by a processor, performs the operations of any one of Clauses 1 through 14.

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A processor-implemented method for processing blocks in a blockchain by a worker process participating in parallel processing of blocks in the blockchain in a transaction processing system, comprising:
retrieving, from the blockchain, a block for processing based on a block number associated with the block and an offset associated with the worker process;
processing the block based on executing one or more function calls or database queries against external compute resources in which data used to validate transactions included in the block is stored; and
inserting the processed block into a buffer associated with a leader process, wherein an index of the processed block in the buffer is based on a size of the buffer and the block number, wherein the processed block includes an indication that the block is an unreported block pending reporting by the leader process to one or more computing resources, and wherein the processed block is inserted into the buffer without obtaining a lock on the buffer blocking a block reporting leader and other worker processes other than the worker process in the transaction processing system from concurrently accessing a location in the buffer associated with the index.

2. The method of claim 1, wherein the offset is based on a number of worker processes instantiated by the leader process for processing blocks from the blockchain in parallel.

3. The method of claim 2, wherein the offset comprises a random number modulo the number of worker processes.

4. The method of claim 1, wherein the block number associated with the block modulo a number of instantiated worker processes equals the offset.

5. The method of claim 1, wherein inserting the processed block into the buffer comprises overwriting a null entry or a reported block in the buffer at an index equal to the block number modulo a size of the buffer.

6. The method of claim 1, wherein the buffer comprises an interleaved buffer written to by the worker process and a plurality of other worker processes.

7. The method of claim 6, wherein a portion of the interleaved buffer associated with the worker process has a size is equal to a size of the interleaved buffer divided by a number of worker processes instantiated by the leader process.

8. The method of claim 1, wherein inserting the processed block into the buffer comprises writing the processed block at the index in the buffer without obtaining a lock on the buffer.

9. The method of claim 1, wherein processing the block comprises:
retrieving transaction data associated with the block from the one or more computing resources; and
validating the block based on the retrieved transaction data.

10. The method of claim 1, wherein:
retrieving the block for processing comprises receiving, via broadcast transmission from the blockchain, information identifying a block number of a last block generated on the blockchain; and
processing the block comprises determining that the worker process is responsible for processing the block based on the block number of the last block generated on the blockchain and the offset.

11. The method of claim 1, wherein retrieving the block for processing comprises requesting blocks for processing from an computing resource from the one or more computing resources associated with the worker process.

12. A system for processing blocks in a blockchain by a worker process participating in parallel processing of blocks in the blockchain in a transaction processing system, comprising:
at least one memory having executable instructions stored thereon; and
one or more processors configured to execute the executable instructions in order to cause the system to:
retrieve, from the blockchain, a block for processing based on a block number associated with the block and an offset associated with the worker process;

process the block based on executing one or more function calls or database queries against external compute resources in which data used to validate transactions included in the block is stored; and insert the processed block into a buffer associated with a leader process, wherein an index of the processed block in the buffer is based on a size of the buffer and the block number, wherein the processed block includes an indication that the block is an unreported block pending reporting by the leader process to one or more computing resources, and wherein the processed block is inserted into the buffer without obtaining a lock on the buffer blocking a block reporting leader and other worker processes other than the worker process in the transaction processing system from concurrently accessing a location in the buffer associated with the index.

13. The system of claim 12, wherein the offset is based on a number of worker processes instantiated by the leader process for processing blocks from the blockchain in parallel.

14. The system of claim 13, wherein the offset comprises a random number modulo the number of worker processes.

15. The system of claim 12, wherein the block number associated with the block modulo a number of instantiated worker processes equals the offset.

16. The system of claim 12, wherein to insert the processed block into the buffer, the one or more processors are configured to cause the system to overwrite a null entry or a reported block in the buffer at an index equal to the block number modulo a size of the buffer.

17. The system of claim 12, wherein the buffer comprises an interleaved buffer written to by the worker process and a plurality of other worker processes.

18. The system of claim 17, wherein a portion of the interleaved buffer associated with the worker process has a size is equal to a size of the interleaved buffer divided by a number of worker processes instantiated by the leader process.

19. The system of claim 12, wherein to insert the processed block into the buffer, the one or more processors are configured to cause the system to write the processed block at the index in the buffer without obtaining a lock on the buffer.

20. The system of claim 12, wherein to process the block, the one or more processors are configured to cause the system to:

retrieve transaction data associated with the block from the one or more computing resources; and validate the block based on the retrieved transaction data.

21. The system of claim 12, wherein:

to retrieve the block for processing, the one or more processors are configured to cause the system to receive, via broadcast transmission from the blockchain, information identifying a block number of a last block generated on the blockchain; and to process the block, the one or more processors are configured to cause the system to determine that the worker process is responsible for processing the block based on the block number of the last block generated on the blockchain and the offset.

22. The system of claim 12, wherein to retrieve the block for processing, the one or more processors are configured to cause the processing system to request blocks for processing from an computing resource from the one or more computing resources associated with the worker process.

23. A non-transitory computer-readable medium having executable instructions stored thereon which, when executed by one or more processors, performs an operation for processing blocks in a blockchain by a worker process participating in parallel processing of blocks in the blockchain in a transaction processing system, the operation comprising:

retrieving, from the blockchain, a block for processing based on a block number associated with the block and an offset associated with the worker process;

processing the block based on executing one or more function calls or database queries against external compute resources in which data used to validate transactions included in the block is stored; and inserting the processed block into a buffer associated with a leader process, wherein an index of the processed block in the buffer is based on a size of the buffer and the block number, wherein the processed block includes an indication that the block is an unreported block pending reporting by the leader process to one or more computing resources, and wherein the processed block is inserted into the buffer without obtaining a lock on the buffer blocking a block reporting leader and other worker processes other than the worker process in the transaction processing system from concurrently accessing a location in the buffer associated with the index.

* * * * *